April 5, 1932. H. W. ROBINSON 1,852,628
TOP FOR COOKING VESSELS
Filed Sept. 17, 1930
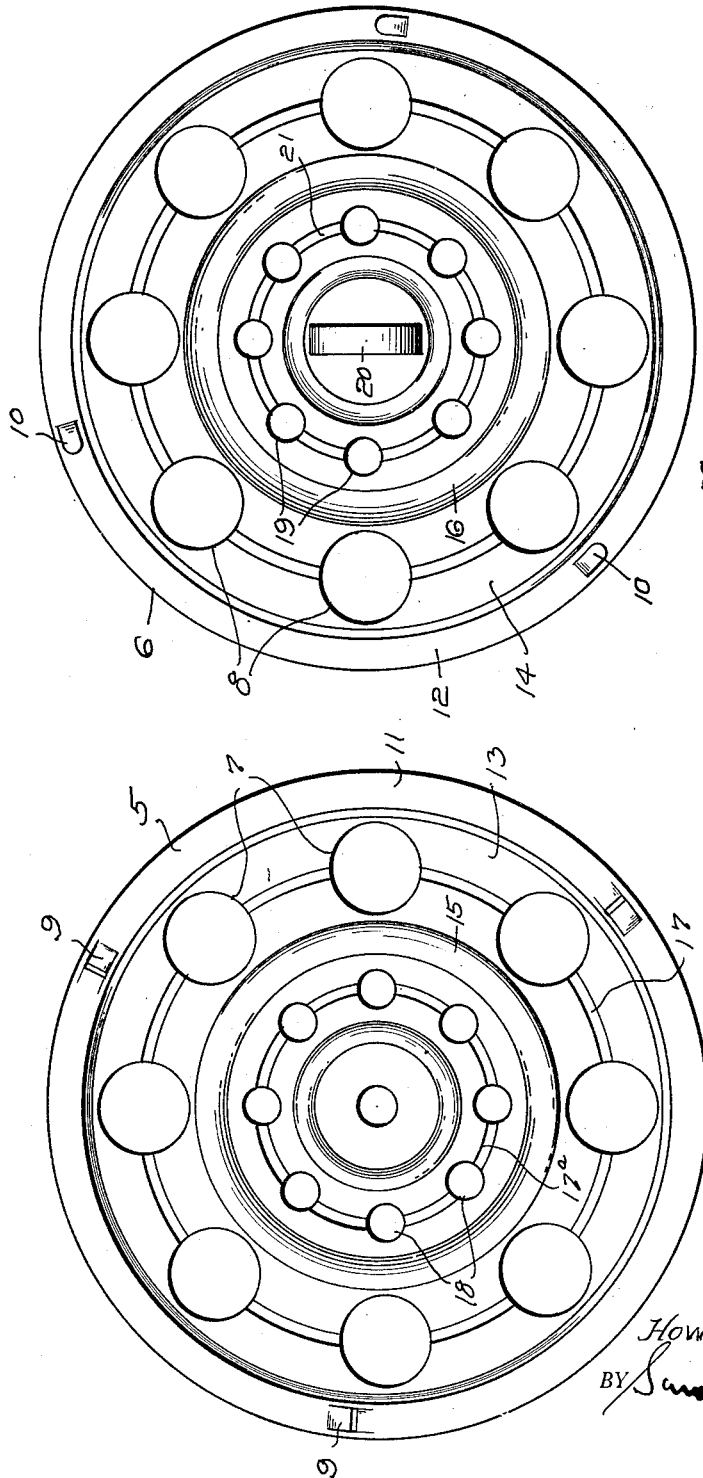
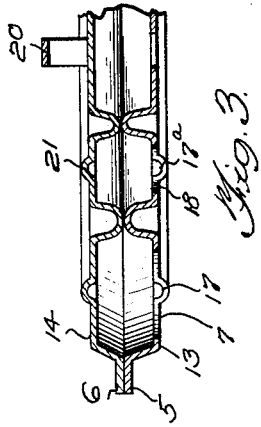
INVENTOR.
Howard W Robinson,
BY Samuel Herrick,
ATTORNEY.

Patented Apr. 5, 1932

1,852,628

UNITED STATES PATENT OFFICE

HOWARD W. ROBINSON, OF TWIN FALLS, IDAHO

TOP FOR COOKING VESSELS

Application filed September 17, 1930. Serial No. 482,565.

This invention relates to tops for cooking vessels of various kinds. While it is adapted to be used upon boilers and bakers, it is particularly adapted for use upon frying pans and kettles.

The object of the invention is to provide a top adapted to permit the free escape of steam, but retaining the heat and grease, whereby better and faster cooking is effected, and the escape of grease to the outside, is prevented. Walls, stoves and other appliances may be kept much cleaner where these tops are used than where open top cookers are employed.

In the accompanying drawings,

Fig. 1 is a plan view of the bottom half of the top.

Fig. 2 is a plan view of the upper half of the top, and

Fig. 3 is a partial sectional view through the top.

Like numerals designate corresponding parts in all of the figures of the drawings.

The top of the present invention comprises a bottom plate 5, and a top plate 6. These plates are provided with steam escape openings 7 and 8, respectively, and they are provided with interengaging sockets 9 and tongues 10, by which, under a limited turning movement of the top, with respect to the bottom, the two parts are locked together. The bottom 5 is provided with a raised rim portion 11, and the top 6 is provided with a depressed rim portion 12, the result of which rim construction is to cause the body portions 13 and 14, respectively, to lie in spaced relation to each other. When the two halves of the top are in assembled portion, the openings 8 lie out of alignment with the openings 7 and, thus, the steam and grease which enters through the openings 7 contact first with the overlying solid portion 14, of the top, and the grease is prevented from spattering out, while the steam is retarded, but finally escapes through the openings 8. The confronting annular ribs 15 and 16, respectively, strengthen the structure, as a whole, and aid in confining the grease in such manner as to cause it to readily enter grooves 17, by which the grease is conducted back to the openings 7, of the bottom plate 5, and discharged back into the cooking vessel.

Corresponding grooves 17a connect openings 18, and the grease collected therein is discharged through openings 18, back into the cooking receptacle. Steam may pass through the openings 18 of the bottom half of the cover and out of the openings 19 of the top half of the cover. These openings lie out of alignment with each other when the parts are in assembled position. A handle 20 is secured to the top half of the cover and provides means by which the structure, as a whole, may be lifted from the cooking vessel.

Grooves 21 may extend between the openings 19, the formation of said grooves, in turn, constituting ribs which aid in strengthening the structure, and in which grooves the grease tends to collect and to be discharged through the openings 18, therebeneath.

It is to be understood that the invention is not limited to the precise construction set forth, because it is apparent that many ways of arranging the ribs, grooves, openings, and the like, will readily suggest themselves to those skilled in the art. A further advantage of the invention resides in the fact that this cover aids in preventing boiling over of the contents of the vessels upon which it is used. I contemplate making the covers round, oblong, angular or any other desired shape and the same is true with respect to the openings which may be round, oblong or angular. It is further to be understood that I contemplate making the covers of any desired material, including tin, aluminium, brass, copper or any other suitable metallic or non-metallic substance. By referring to Fig. 3 it will be seen that the two plates lie in substantial parallelism with each other so that the structure. as a whole, is substantially flat and when the cover is placed upon a shallow cooking vessel, such as a frying pan for example, resting upon the flanges 5, it does not project downwardly into the cooking vessel far enough to interfere with the contents thereof. Further, this generally flat shape is much easier to wash and keep clean than any other shape. In addition it is pointed that the structure proposed is such that the halves may be readily separated, if desired, for purpose of cleaning.

Furthermore, while the sockets 9 and tongues 10 provide simple means for uniting the upper and lower plates, it is apparent that these parts may be soldered, or otherwise, secured together. Consequently, it is to be understood that the invention includes within its purview whatever changes fairly come within either the terms or the spirit of the appended claims.

Having described my invention, what I claim is:

1. A cover of the character described, comprising a pair of similar plates, each comprising a rim and a body portion offset from said rim, a plurality of circumferential ribs formed upon said body portion and projecting inwardly in such position that when the plates are brought together with their rims in contact with each other their body portions will be spaced apart and said ribs will contact along the junction line of said ribs, means carried by said rims adapted to interlock upon a partial turning movement of one plate with respect to the other, a plurality of openings in each of said plates, the openings of one plate lying out of alignment with the openings of the other plate and a grease and moisture collecting groove establishing communication between the openings of the lower plate.

2. A cover of the character described comprising a pair of similar plates each comprising a rim and a body portion offset from said rim, a circumferential rib formed upon each of said plates and projecting inwardly in such position that when the plates are brought together with their rims in contact with each other their body portions will be spaced apart and said ribs will contact along their confronting faces, tongues struck from one of said rims, and openings formed in the other of said rims adapted to receive said tongues upon a partial turning movement of the plates with respect to each other, each of said plates having a plurality of openings therein, the openings of one plate lying out of alignment with the openings of the other plate.

In testimony whereof I affix my signature.

HOWARD W. ROBINSON.